J. B. WILFORD.
Coal Separators.
No. 143,395. Patented September 30, 1873.
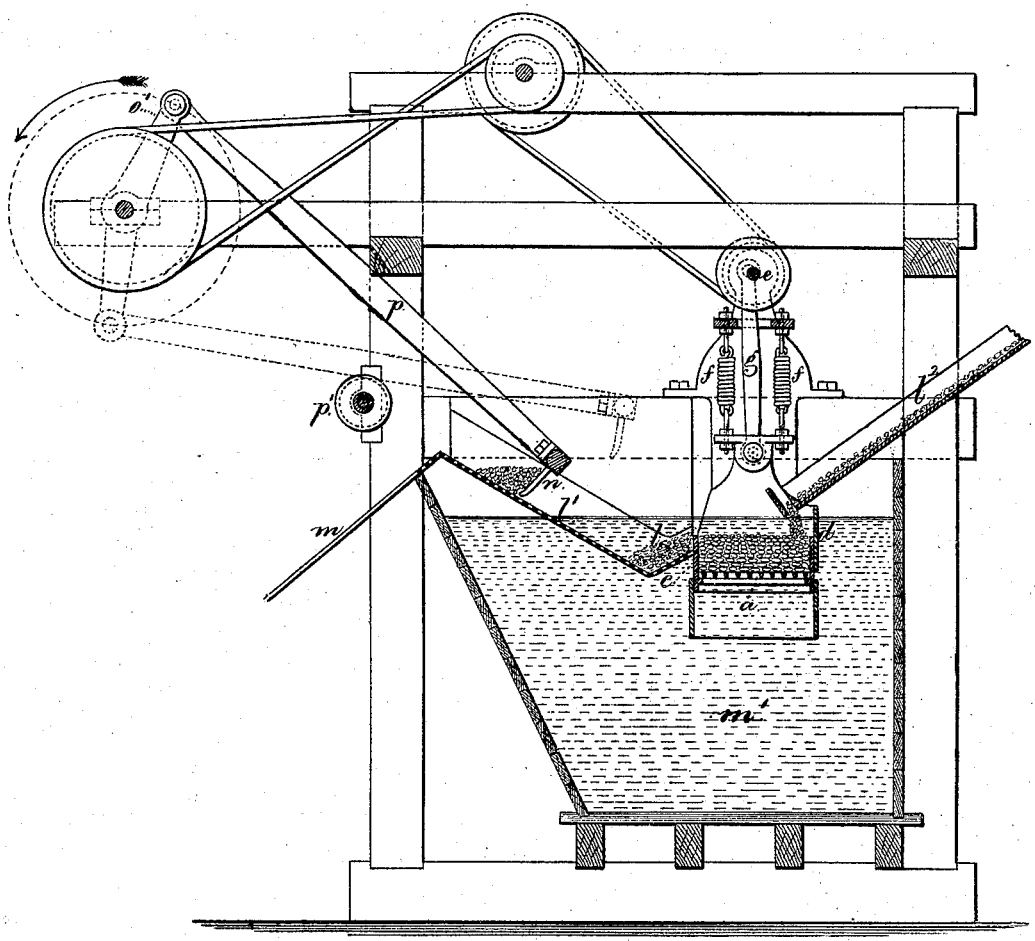

UNITED STATES PATENT OFFICE.

JOHN B. WILFORD, OF READING, PENNSYLVANIA, ASSIGNOR TO HEZEKIAH BRADFORD, OF SAME PLACE.

IMPROVEMENT IN COAL-SEPARATORS.

Specification forming part of Letters Patent No. 143,395, dated September 30, 1873; application filed March 25, 1873.

*To all whom it may concern:*

Be it known that I, JOHN B. WILFORD, of Reading, in the State of Pennsylvania, have invented an Improvement in Apparatus for Separating Coal, &c., of which the following is a specification:

This invention is a modification of, and improvement upon, the apparatus invented by Hezekiah Bradford, and originally shown in Letters Patent No. 20,756, and subsequently improved by him.

In my present invention, the jig is made with a perforated bottom, $a$, sides $c$ $d$, actuating-shaft and crank $e$, connecting-rod $g$, and counterpoise-spring $f$, as in the devices invented by said Bradford; and the coal or other material is supplied by the chute $l^2$, and, by the jigging movement of the material in the water contained in the tank or vat $m'$, the heavier materials descend and pass through the perforated jig-bottom, and the lighter materials pass over the edge of the jig into the receptacle $l$. These features of this apparatus, not forming any portion of my invention, do not require to be further described.

My present invention relates to an improved means for actuating the rake $n$, that draws the material up the incline $l^1$, and delivers the same upon the chute $m$.

The rake employed before my present invention for the aforesaid purpose had the ends of its head running in cam-shaped grooves, and hence there was considerable friction, and the rake dropped down suddenly by its weight upon the material or the incline at the risk of injury to the teeth.

Sometimes the accumulation of material prevented the rake-head falling below the end of the pawl, involving injury to the mechanism, or else stopping the motion of the rake and the proper delivery of the material.

I make use of a crank, $o'$, revolving in the direction indicated in the drawing, and to this crank the handle $p$ of the rake $n$ is connected.

It is preferable to have two cranks and two handles for wide rakes; but, with narrow rakes, one handle may be sufficient.

A roller or rollers, $p'$, are connected to the frame of the machine, and are positioned so that the rake handle or handles rest upon the same as the rake completes its upward movement; hence such rollers act as fulcrums for lifting the rake bodily from the coal or other material, and support such rake above the coal, as seen by dotted lines, while returning to the lower portion of the incline; and the position of these rollers $p'$ is such that the revolution of the crank $o'$ causes the rake to descend behind the coal at the lowest end of the incline, and the further movement of the rake draws the coal or other material up the said incline, and delivers it, as aforesaid.

By this construction, the rake-handle receives an oscillating motion upon the return movement of the rake, similar to lifting it by hand, the rake is not liable to injury, and it operates unimpeded upon the coal or other material to draw the same up the incline.

A swinging link might take the place of the roller, if desired.

I claim as my invention—

The rake reciprocated by the crank $o'$, in combination with mechanism that acts upon the rake-handle to lift the rake upon the return movement, and with the incline $l^1$ and separating-jig, substantially as set forth.

Signed by me this 20th day of March, A. D. 1873.

JNO. B. WILFORD.

Witnesses:
GEO. T. PINCKNEY,
CHAS. H. SMITH.